US008935718B2

(12) United States Patent
Aaltonen

(10) Patent No.: US 8,935,718 B2
(45) Date of Patent: Jan. 13, 2015

(54) ADVERTISING MANAGEMENT METHOD AND SYSTEM

(75) Inventor: Janne Aaltonen, Turku (FI)

(73) Assignee: Apple Inc., Cupertino, CA (US)

( * ) Notice: Subject to any disclaimer, the term of this patent is extended or adjusted under 35 U.S.C. 154(b) by 518 days.

(21) Appl. No.: 12/080,124

(22) Filed: Apr. 4, 2008

(65) Prior Publication Data

US 2008/0295128 A1 Nov. 27, 2008

Related U.S. Application Data

(60) Provisional application No. 60/931,398, filed on May 22, 2007.

(51) Int. Cl.
*H04N 7/10* (2006.01)
*H04N 7/025* (2006.01)

(Continued)

(52) U.S. Cl.
CPC ........... *H04L 63/10* (2013.01); *H04L 2463/101* (2013.01); *G06F 21/10* (2013.01); *H04N 7/17318* (2013.01); *H04N 21/2668* (2013.01); *H04N 21/47202* (2013.01); *H04N 21/2665* (2013.01); *H04N 21/26616* (2013.01); *G06Q 10/10* (2013.01); *H04N 21/2393* (2013.01); *H04N 21/2543* (2013.01); *H04N 21/6334* (2013.01); *H04N 21/64315* (2013.01); *G06Q 30/02* (2013.01); *H04N 21/25875* (2013.01); *H04N 21/2407* (2013.01); *H04N 21/41407* (2013.01)
USPC ................................. 725/32; 725/28; 725/86

(58) Field of Classification Search
CPC .................... H04N 21/23424; H04N 21/4331; H04N 21/812
See application file for complete search history.

(56) References Cited

U.S. PATENT DOCUMENTS 5,408,519 A 4/1995 Pierce et al.
5,459,306 A 10/1995 Stein et al.

(Continued)

FOREIGN PATENT DOCUMENTS

BE 1015704 7/2005
DE 199 41 461 A1 3/2001

(Continued)

OTHER PUBLICATIONS

International Preliminary Report on Patentability issued Nov. 24, 2009 in International Application PCT/EP2008/056342 (1 page).

(Continued)

*Primary Examiner* — Mark D Featherstone
(74) *Attorney, Agent, or Firm* — Novak Druce Connolly Bove + Quigg LLP

(57) ABSTRACT

System and method for managing distribution of content such as television programs to portable multi-media devices which are capable of using such content and communicating includes a broadcast management system arranged to manage delivery of content from content sources to the devices, an account management system arranged to manage requests for use of the content from the devices and manage communications to and from the devices, and a processor coupled to the account management system and arranged to analyze requests to use content relative to information about users of the devices in order to determine whether use of the content by the users can be sponsored. If so, an advertisement is delivered to that user's device and the device presents the advertisement to the user as a condition for use of the content.

45 Claims, 3 Drawing Sheets

(51) Int. Cl.

| | |
|---|---|
| ***H04N 7/16*** | (2011.01) |
| ***H04N 7/173*** | (2011.01) |
| ***G06F 21/10*** | (2013.01) |
| ***H04N 21/2668*** | (2011.01) |
| ***H04N 21/472*** | (2011.01) |
| ***H04N 21/2665*** | (2011.01) |
| ***H04N 21/266*** | (2011.01) |
| ***G06Q 10/10*** | (2012.01) |
| ***H04N 21/239*** | (2011.01) |
| ***H04L 29/06*** | (2006.01) |
| ***H04N 21/2543*** | (2011.01) |
| ***H04N 21/6334*** | (2011.01) |
| ***H04N 21/643*** | (2011.01) |
| ***G06Q 30/02*** | (2012.01) |
| ***H04N 21/258*** | (2011.01) |
| ***H04N 21/24*** | (2011.01) |
| ***H04N 21/414*** | (2011.01) |

(56) References Cited

U.S. PATENT DOCUMENTS 5,600,364 A 2/1997 Hendricks et al.
5,613,213 A 3/1997 Naddell et al.
5,678,179 A 10/1997 Turcotte et al.
5,974,398 A 10/1999 Hanson
5,978,775 A 11/1999 Chen
5,978,833 A 11/1999 Pashley et al.
6,006,197 A 12/1999 d'Eon et al.
6,009,410 A 12/1999 LeMole et al.
6,015,344 A 1/2000 Kelly
6,023,700 A 2/2000 Owens et al.
6,029,195 A 2/2000 Herz
6,055,512 A 4/2000 Dean et al.
6,055,513 A 4/2000 Katz et al.
6,057,872 A * 5/2000 Candelore ...................... 725/23
6,097,942 A 8/2000 Laiho
6,202,086 B1 3/2001 Maruyama et al.
6,253,189 B1 6/2001 Feezell et al.
6,286,005 B1 9/2001 Cannon
6,334,145 B1 12/2001 Adams et al.
6,338,044 B1 1/2002 Cook et al.
6,345,279 B1 2/2002 Li et al.
6,381,465 B1 4/2002 Chern et al.
6,393,407 B1 5/2002 Middleton, III et al.
6,405,243 B1 6/2002 Nielsen
6,408,309 B1 6/2002 Agarwal
6,446,261 B1 * 9/2002 Rosser ........................... 725/34
6,502,076 B1 12/2002 Smith
6,564,261 B1 5/2003 Gudjonsson et al.
6,598,228 B2 * 7/2003 Hejna, Jr. ........................ 725/91
6,647,269 B2 11/2003 Hendrey et al.
6,684,249 B1 1/2004 Frerichs et al.
6,690,394 B1 2/2004 Harui
6,698,020 B1 * 2/2004 Zigmond et al. ................ 725/34
6,718,551 B1 4/2004 Swix et al.
6,738,978 B1 5/2004 Hendricks et al.
6,795,808 B1 9/2004 Strubbe et al.
6,820,204 B1 11/2004 Desai
6,886,000 B1 4/2005 Aggarwal et al.
6,889,054 B2 5/2005 Himmel et al.
6,920,326 B2 7/2005 Agarwal et al.
6,990,462 B1 1/2006 Wilcox et al.
7,016,864 B1 3/2006 Notz et al.
7,028,001 B1 4/2006 Muthuswamy et al.
7,039,599 B2 5/2006 Merriman et al.
7,072,947 B1 7/2006 Knox et al.
7,076,445 B1 7/2006 Cartwright
7,136,871 B2 11/2006 Ozer et al.
7,149,537 B1 12/2006 Kupsh et al.
7,155,243 B2 12/2006 Baldwin et al.
7,168,084 B1 1/2007 Hendricks et al.
7,200,633 B2 4/2007 Sekiguchi et al.
7,203,684 B2 4/2007 Carobus et al.
7,251,495 B2 7/2007 Keyani et al.
7,263,535 B2 8/2007 Malik
7,280,818 B2 10/2007 Clayton
7,280,979 B1 10/2007 Katz
7,346,630 B2 3/2008 Eichstadt et al.
7,349,527 B2 3/2008 Yacoub et al.
7,356,477 B1 4/2008 Allan et al.
7,370,002 B2 5/2008 Heckerman et al.
7,386,485 B1 6/2008 Mussman
7,539,652 B2 5/2009 Flinn et al.
7,555,563 B2 6/2009 Ott et al.
7,558,559 B2 7/2009 Alston
7,660,859 B2 2/2010 MacBeth et al.
7,669,212 B2 2/2010 Alao et al.
7,685,019 B2 3/2010 Collins
7,730,017 B2 6/2010 Nance et al.
7,730,149 B2 6/2010 Aaltonen
7,734,632 B2 6/2010 Wang
7,747,676 B1 6/2010 Nayfeh et al.
7,774,419 B2 8/2010 Aaltonen
7,856,413 B2 12/2010 Cradick et al.
7,870,576 B2 1/2011 Eldering
7,873,708 B2 1/2011 Durand et al.
7,882,518 B2 2/2011 Finseth et al.
7,903,099 B2 3/2011 Baluja
7,912,843 B2 3/2011 Murdock et al.
7,925,283 B2 4/2011 Smith et al.
7,933,799 B2 4/2011 Aaltonen et al.
7,974,988 B2 7/2011 Nandiwada et al.
7,979,314 B2 7/2011 Ulenas
7,984,014 B2 7/2011 Song et al.
8,046,797 B2 10/2011 Bentolila et al.
8,046,810 B2 10/2011 Srivastava
8,060,406 B2 11/2011 Blegen
8,086,476 B2 12/2011 Baur et al.
8,099,325 B2 1/2012 Gangadharpalli et al.
8,099,490 B2 1/2012 Deakin
8,191,098 B2 5/2012 Cooper et al.
8,196,166 B2 6/2012 Roberts
8,229,786 B2 7/2012 Cetin et al.
8,380,562 B2 2/2013 Toebes et al.
8,392,249 B2 3/2013 Koningstein et al.
2001/0044739 A1 11/2001 Bensemana
2001/0047272 A1 11/2001 Frietas et al.
2001/0049653 A1 12/2001 Sheets
2001/0051925 A1 12/2001 Kang
2002/0004743 A1 1/2002 Kutaragi et al.
2002/0006803 A1 1/2002 Mendiola et al.
2002/0010645 A1 1/2002 Hagen et al.
2002/0016736 A1 2/2002 Cannon et al.
2002/0019829 A1 2/2002 Shapiro
2002/0021809 A1 2/2002 Salo et al.
2002/0026356 A1 2/2002 Bergh et al.
2002/0029249 A1 3/2002 Campbell et al.
2002/0032602 A1 3/2002 Lanzillo, Jr. et al.
2002/0046341 A1 4/2002 Kazaks
2002/0052781 A1 5/2002 Aufricht et al.
2002/0052788 A1 5/2002 Perkes
2002/0075305 A1 6/2002 Beaton et al.
2002/0077130 A1 6/2002 Owensby
2002/0078147 A1 6/2002 Bouthors et al.
2002/0083411 A1 6/2002 Bouthors et al.
2002/0087335 A1 7/2002 Meyers et al.
2002/0099842 A1 * 7/2002 Jennings et al. .............. 709/231
2002/0111177 A1 8/2002 Castres et al.
2002/0120498 A1 8/2002 Gordon et al.
2002/0128907 A1 9/2002 Sato et al.
2002/0128908 A1 9/2002 Levin et al.
2002/0137507 A1 9/2002 Winkler
2002/0138291 A1 9/2002 Vaidyanathan et al.
2002/0138400 A1 9/2002 Kitchen
2002/0161770 A1 10/2002 Shapiro et al.
2002/0164977 A1 11/2002 Link, II et al.
2002/0165773 A1 11/2002 Natsuno et al.
2002/0175935 A1 11/2002 Wang et al.
2003/0003935 A1 1/2003 Vesikivi et al.
2003/0023489 A1 1/2003 McGuire et al.
2003/0028597 A1 2/2003 Salmi
2003/0032409 A1 2/2003 Hutcheson et al.

(56) References Cited

U.S. PATENT DOCUMENTS

2003/0037103 A1 2/2003 Salmi
2003/0040297 A1 2/2003 Pecen et al.
2003/0040300 A1 2/2003 Bodic et al.
2003/0083931 A1 5/2003 Lang
2003/0101454 A1 5/2003 Ozer et al.
2003/0126015 A1 7/2003 Chan et al.
2003/0126079 A1 7/2003 Roberson
2003/0126146 A1 7/2003 Van Der Riet
2003/0130887 A1 7/2003 Nathaniel
2003/0144022 A1 7/2003 Hatch
2003/0154300 A1 8/2003 Mostafa
2003/0182567 A1 9/2003 Barton et al.
2003/0188017 A1 10/2003 Nomura
2003/0191689 A1 10/2003 Bosarge et al.
2003/0197719 A1 10/2003 Lincke et al.
2003/0220946 A1 11/2003 Malik
2004/0003398 A1 1/2004 Donian et al.
2004/0019637 A1 1/2004 Goodman
2004/0043777 A1 3/2004 Brouwer et al.
2004/0045029 A1 3/2004 Matsuura
2004/0054576 A1 3/2004 Kanerva et al.
2004/0068435 A1 4/2004 Braunzell
2004/0103157 A1 5/2004 Requena et al.
2004/0107256 A1 6/2004 Odenwald
2004/0128353 A1 7/2004 Goodman
2004/0133480 A1 7/2004 Domes
2004/0136358 A1 7/2004 Hind et al.
2004/0158612 A1 8/2004 Concannon
2004/0158858 A1* 8/2004 Paxton et al. .................. 725/42
2004/0185883 A1 9/2004 Rukman
2004/0192359 A1 9/2004 McRaild et al.
2004/0203761 A1 10/2004 Baba et al.
2004/0203851 A1 10/2004 Vetro et al.
2004/0204133 A1 10/2004 Andrew et al.
2004/0209649 A1 10/2004 Lord
2004/0240649 A1 12/2004 Goel
2004/0254993 A1 12/2004 Mamas
2004/0254994 A1 12/2004 Diorio et al.
2004/0259526 A1 12/2004 Goris et al.
2004/0267806 A1 12/2004 Lester
2005/0004840 A1 1/2005 Wanninger et al.
2005/0010641 A1 1/2005 Staack
2005/0021397 A1 1/2005 Cui et al.
2005/0033700 A1 2/2005 Vogler et al.
2005/0060425 A1 3/2005 Yeh et al.
2005/0075929 A1 4/2005 Wolinsky et al.
2005/0119936 A1 6/2005 Buchanan et al.
2005/0125397 A1 6/2005 Gross et al.
2005/0138140 A1 6/2005 Wen et al.
2005/0160165 A1 7/2005 Chen
2005/0192008 A1 9/2005 Desai
2005/0228680 A1 10/2005 Malik
2005/0228739 A1 10/2005 Leibowitz
2005/0228797 A1 10/2005 Koningstein et al.
2005/0229209 A1 10/2005 Hildebolt et al.
2005/0233776 A1 10/2005 Allen
2005/0239495 A1 10/2005 Bayne
2005/0239504 A1 10/2005 Ishii et al.
2005/0249216 A1 11/2005 Jones
2005/0267798 A1 12/2005 Panara
2005/0273465 A1 12/2005 Kimura
2005/0273833 A1 12/2005 Soinio
2005/0281237 A1 12/2005 Heinonen et al.
2005/0289113 A1 12/2005 Bookstaff
2006/0031164 A1 2/2006 Kim
2006/0031327 A1 2/2006 Kredo
2006/0037039 A1 2/2006 Aaltonen
2006/0040642 A1 2/2006 Boris et al.
2006/0041470 A1 2/2006 Filho et al.
2006/0048059 A1 3/2006 Etkin
2006/0053208 A1 3/2006 Laurila et al.
2006/0053225 A1 3/2006 Poikselka et al.
2006/0059133 A1 3/2006 Moritani
2006/0068845 A1 3/2006 Muller et al.
2006/0075425 A1* 4/2006 Koch et al. ...................... 725/32
2006/0089948 A1 4/2006 Picker et al.
2006/0095511 A1 5/2006 Munarriz et al.
2006/0117378 A1 6/2006 Tam et al.
2006/0123014 A1 6/2006 Ng
2006/0129455 A1 6/2006 Shah
2006/0141923 A1 6/2006 Goss
2006/0161520 A1 7/2006 Brewer et al.
2006/0161599 A1 7/2006 Rosen
2006/0167747 A1 7/2006 Goodman et al.
2006/0168616 A1 7/2006 Candelore
2006/0190331 A1 8/2006 Tollinger et al.
2006/0194595 A1 8/2006 Myllynen et al.
2006/0200460 A1 9/2006 Meyerzon et al.
2006/0200461 A1 9/2006 Lucas et al.
2006/0206586 A1 9/2006 Ling et al.
2006/0212583 A1 9/2006 Beadle
2006/0240850 A1 10/2006 Kaplan
2006/0253327 A1 11/2006 Morris et al.
2006/0276170 A1 12/2006 Radhakrishnan et al.
2006/0276213 A1 12/2006 Gottschalk et al.
2006/0282328 A1 12/2006 Gerace et al.
2006/0286963 A1 12/2006 Koskinen et al.
2006/0286964 A1 12/2006 Polanski et al.
2006/0288124 A1 12/2006 Kraft et al.
2007/0004333 A1 1/2007 Kavanti
2007/0004380 A1 1/2007 Ylikoski
2007/0011344 A1* 1/2007 Paka et al. ..................... 709/231
2007/0016743 A1 1/2007 Jevans
2007/0022021 A1 1/2007 Walker et al.
2007/0027703 A1 2/2007 Hu et al.
2007/0027760 A1 2/2007 Collins et al.
2007/0033104 A1 2/2007 Collins et al.
2007/0037562 A1 2/2007 Smith-Kerker et al.
2007/0047523 A1 3/2007 Jiang
2007/0061195 A1 3/2007 Liu et al.
2007/0061300 A1 3/2007 Ramer et al.
2007/0066295 A1 3/2007 Wennberg
2007/0067215 A1 3/2007 Agarwal et al.
2007/0072631 A1 3/2007 Mock et al.
2007/0074262 A1 3/2007 Kikkoji et al.
2007/0078712 A1 4/2007 Ott et al.
2007/0083602 A1 4/2007 Heggenhougen et al.
2007/0088687 A1 4/2007 Bromm et al.
2007/0088801 A1 4/2007 Levkovitz et al.
2007/0088851 A1 4/2007 Levkovitz et al.
2007/0094066 A1 4/2007 Kumar et al.
2007/0100651 A1 5/2007 Ramer et al.
2007/0100653 A1 5/2007 Ramer
2007/0100805 A1 5/2007 Ramer et al.
2007/0105536 A1 5/2007 Tingo, Jr.
2007/0113243 A1 5/2007 Brey
2007/0117571 A1 5/2007 Musial
2007/0118592 A1 5/2007 Bachenberg
2007/0136457 A1 6/2007 Dai et al.
2007/0149208 A1 6/2007 Syrbe et al.
2007/0174295 A1 7/2007 Abraham et al.
2007/0179819 A1 8/2007 Bradley et al.
2007/0180147 A1 8/2007 Leigh
2007/0192281 A1 8/2007 Cradick et al.
2007/0192409 A1 8/2007 Kleinstern et al.
2007/0198485 A1 8/2007 Ramer et al.
2007/0208619 A1 9/2007 Branam et al.
2007/0214470 A1* 9/2007 Glasgow et al. ................ 725/10
2007/0226097 A1 9/2007 Keechle
2007/0233671 A1 10/2007 Oztekin et al.
2007/0244750 A1 10/2007 Grannan et al.
2007/0260624 A1 11/2007 Chung et al.
2007/0288950 A1 12/2007 Downey et al.
2007/0290787 A1 12/2007 Fiatal et al.
2008/0004046 A1 1/2008 Mumick et al.
2008/0004947 A1 1/2008 Mathew et al.
2008/0004958 A1 1/2008 Ralph et al.
2008/0010117 A1 1/2008 Oliveira et al.
2008/0013537 A1 1/2008 Dewey et al.
2008/0019516 A1* 1/2008 Fransdonk ................... 380/201
2008/0032703 A1 2/2008 Krumm et al.
2008/0032717 A1 2/2008 Sawada et al.
2008/0040175 A1 2/2008 Dellovo
2008/0052158 A1 2/2008 Ferro et al.

(56) References Cited

U.S. PATENT DOCUMENTS

2008/0057920 A1 3/2008 Pettit
2008/0065491 A1 3/2008 Bakman
2008/0070579 A1 3/2008 Kankar et al.
2008/0071875 A1 3/2008 Koff et al.
2008/0071929 A1 3/2008 Motte et al.
2008/0082686 A1 4/2008 Schmidt et al.
2008/0086369 A1 4/2008 Kiat et al.
2008/0091796 A1 4/2008 Story
2008/0109519 A1 5/2008 Aaltonen
2008/0114639 A1 5/2008 Meek et al.
2008/0133344 A1 6/2008 Hyder et al.
2008/0134043 A1 6/2008 Georgis et al.
2008/0140508 A1 6/2008 Anand et al.
2008/0201731 A1 8/2008 Howcraft
2008/0215436 A1 9/2008 Roberts
2008/0228568 A1 9/2008 Williams et al.
2008/0235342 A1 9/2008 Aaltonen
2008/0243619 A1 10/2008 Sharman et al.
2008/0244024 A1 10/2008 Aaltonen
2008/0249832 A1 10/2008 Richardson et al.
2008/0262927 A1 10/2008 Kanayama et al.
2008/0271068 A1 10/2008 Ou et al.
2008/0281606 A1 11/2008 Kitts et al.
2008/0288476 A1 11/2008 Kim et al.
2008/0319836 A1 12/2008 Aaltonen et al.
2009/0006194 A1 1/2009 Sridharan et al.
2009/0029721 A1 1/2009 Doraswamy
2009/0049090 A1 2/2009 Shenfield et al.
2009/0063249 A1 3/2009 Tomlin et al.
2009/0106111 A1 4/2009 Walk et al.
2009/0125377 A1 5/2009 Somji et al.
2009/0132395 A1 5/2009 Lam et al.
2009/0138304 A1 5/2009 Aharoni et al.
2009/0141875 A1 6/2009 Demmitt
2009/0197619 A1 8/2009 Colligan et al.
2009/0216847 A1 8/2009 Krishnaswamy et al.
2009/0240677 A1 9/2009 Parekh et al.
2009/0275315 A1 11/2009 Alston
2009/0286520 A1 11/2009 Nielsen et al.
2009/0287619 A1 11/2009 Liang et al.
2009/0298483 A1 12/2009 Bratu et al.
2010/0010887 A1 1/2010 Karlin et al.
2010/0030647 A1 2/2010 Shahshahani
2010/0082397 A1 4/2010 Blegen et al.
2010/0082423 A1 4/2010 Nag et al.
2010/0088152 A1 4/2010 Bennett
2010/0114654 A1 5/2010 Lukose et al.
2010/0125505 A1 5/2010 Puttaswamy
2010/0138271 A1 6/2010 Henkin
2010/0145936 A1 6/2010 Grinstein et al.
2010/0153216 A1 6/2010 Liang et al.
2010/0161424 A1 6/2010 Sylvain
2010/0169157 A1 7/2010 Muhonen et al.
2010/0169176 A1 7/2010 Turakhia
2010/0205541 A1 8/2010 Rapaport et al.
2010/0228603 A1 9/2010 Bolder et al.
2011/0087526 A1 4/2011 Morgenstern et al.
2011/0106840 A1 5/2011 Barrett et al.
2011/0145059 A1 6/2011 Baluja
2011/0209067 A1 8/2011 Bogess et al.
2011/0225048 A1 9/2011 Nair
2011/0238485 A1 9/2011 Haumont et al.
2011/0276401 A1 11/2011 Knowles et al.

FOREIGN PATENT DOCUMENTS

DE 10061984 6/2002
EP 0 831 629 A2 3/1998
EP 1 043 905 10/2000
EP 1061465 12/2000
EP 1073293 1/2001
EP 1 107 137 A2 6/2001
EP 1 109 371 A2 6/2001
EP 1161093 12/2001
EP 1182845 2/2002
EP 1 195 701 A1 4/2002
EP 1193955 4/2002
EP 1220132 7/2002
EP 1239392 9/2002
EP 1239395 9/2002
EP 1253542 10/2002
EP 1280087 1/2003
EP 1298945 4/2003
EP 1303107 4/2003
EP 1324250 7/2003
EP 1365604 11/2003
EP 1408705 4/2004
EP 1455511 9/2004
EP 1 509 024 A2 2/2005
EP 1528827 5/2005
EP 1542482 6/2005
EP 1587332 10/2005
EP 1594287 11/2005
EP 1613102 1/2006
EP 1615455 1/2006
EP 1 633 100 A1 3/2006
EP 1677475 7/2006
EP 1772822 4/2007
FR 2867931 9/2005
GB 2 343 051 A 4/2000
GB 2352856 2/2001
GB 2356777 5/2001
GB 2369218 5/2002
GB 2372867 9/2002
GB 2383149 6/2003
GB 2 386 509 A 9/2003
GB 2406996 4/2005
GB 2407002 4/2005
GB 2 414 621 A 11/2005
GB 2 416 887 A 2/2006
GB 2 424 546 A 9/2006
JP 2002-140272 5/2002
JP 2007087138 4/2007
JP 2007199821 8/2007
KR 2003-0049440 6/2003
KR 200644760 A 2/2006
KR 2007-011675 11/2007
WO WO 89/10610 11/1989
WO 96/4213 8/1996
WO 97/33421 9/1997
WO 98/21713 5/1998
WO 98/37685 8/1998
WO 00/00916 1/2000
WO 00/30002 et al. 5/2000
WO 00/44151 7/2000
WO WO 00/70848 11/2000
WO WO 01/22748 A1 3/2001
WO WO 01/31497 A1 5/2001
WO 01/44977 6/2001
WO 01/52161 7/2001
WO 01/55892 8/2001
WO 01/58178 8/2001
WO 01/63423 8/2001
WO WO 01/57705 A1 8/2001
WO 01/69406 9/2001
WO 01/72063 9/2001
WO WO 01/65411 A1 9/2001
WO WO 01/71949 A1 9/2001
WO 01/77840 10/2001
WO 01/78425 10/2001
WO 01/91400 11/2001
WO 01/93551 12/2001
WO 01/97539 12/2001
WO WO 02/09431 A2 1/2002
WO 02/31624 4/2002
WO WO 02/35324 A2 5/2002
WO 02/44834 6/2002
WO 02/44989 6/2002
WO WO 02/50632 A2 6/2002
WO 02/054803 7/2002
WO 02/059720 8/2002
WO 02/069651 9/2002
WO 02/075574 9/2002

(56) References Cited

FOREIGN PATENT DOCUMENTS

| | | | |
|---|---|---|---|
| WO | WO 02/069585 | A2 | 9/2002 |
| WO | 02/080595 | | 10/2002 |
| WO | 02/084895 | | 10/2002 |
| WO | WO 02/086664 | A2 | 10/2002 |
| WO | 02/096056 | | 11/2002 |
| WO | WO 02/100121 | | 12/2002 |
| WO | WO 03/015430 | A1 | 2/2003 |
| WO | 03/019845 | | 3/2003 |
| WO | WO 03/019913 | A1 | 3/2003 |
| WO | WO 03/024136 | A1 | 3/2003 |
| WO | 03/038638 | | 5/2003 |
| WO | 03/049461 | | 6/2003 |
| WO | 03/058458 | | 7/2003 |
| WO | 03/073304 | | 9/2003 |
| WO | 03/088690 | | 10/2003 |
| WO | 2004/034671 | | 4/2004 |
| WO | 2004/054205 | | 6/2004 |
| WO | WO 2004/057578 | | 7/2004 |
| WO | 2004/084532 | | 9/2004 |
| WO | 2004/086791 | | 10/2004 |
| WO | WO 2004/093044 | | 10/2004 |
| WO | 2004/100470 | | 11/2004 |
| WO | 2004/100521 | | 11/2004 |
| WO | 2004/102993 | | 11/2004 |
| WO | 2004/104867 | | 12/2004 |
| WO | 2004/114109 | | 12/2004 |
| WO | 2005/015806 | | 2/2005 |
| WO | WO 2005/020578 | A1 | 3/2005 |
| WO | WO 2005/029769 | A1 | 3/2005 |
| WO | 2005/062637 | | 7/2005 |
| WO | 2005/073863 | | 8/2005 |
| WO | 2005/076650 | | 8/2005 |
| WO | 2006/002869 | | 1/2006 |
| WO | 2006/005001 | | 1/2006 |
| WO | 2006/011164 | | 2/2006 |
| WO | 2006/016189 | | 2/2006 |
| WO | 2006/024003 | | 3/2006 |
| WO | 2006/026505 | | 3/2006 |
| WO | 2006/027407 | | 3/2006 |
| WO | 2006/040749 | | 4/2006 |
| WO | 2006/093284 | | 9/2006 |
| WO | 2006/105202 | | 10/2006 |
| WO | 2006/110446 | | 10/2006 |
| WO | WO 2006/119481 | A2 | 11/2006 |
| WO | 2007/002025 | | 1/2007 |
| WO | WO 2007/001118 | A1 | 1/2007 |
| WO | 2007/031708 | | 3/2007 |
| WO | 2007/056698 | | 5/2007 |
| WO | 2007/060451 | | 5/2007 |
| WO | 2007/091089 | | 8/2007 |
| WO | 2007/103263 | | 9/2007 |
| WO | 2008/013437 | | 1/2008 |
| WO | WO 2008/024852 | A2 | 2/2008 |
| WO | 2008/045867 | | 4/2008 |
| WO | 2008/053062 | | 5/2008 |
| WO | 2008/147919 | | 12/2008 |
| WO | 2009/009507 | | 1/2009 |
| WO | 2009/032856 | | 3/2009 |
| WO | 2009/061914 | | 5/2009 |
| WO | 2009/077888 | | 7/2009 |
| WO | 2009/099876 | | 8/2009 |
| WO | 2009/158097 | | 12/2009 |

OTHER PUBLICATIONS

Written Opinion of the International Searching Authority issued Nov. 24, 2009 in International Application PCT/EP2008/056342 (6 pages).

Communication (International Search Report along with Written Opinion of International Searching Authority) mailed Oct. 8, 2008 issued by the International Searching Authority in counterpart International Application PCT/EP2008/056342.

Communication (European Search Report) dated Oct. 17, 2008 issued by the European Patent Office in counterpart European Patent Application EP 08 15 6763.

Communication (Search Report under Section 17 along with Examination Report under Section 18(3)) dated Oct. 6, 2008 issued by the United Kingdom Intellectual Property Office in counterpart U.K. Application GB 08094321.3.

“AdWords Reference Guide”, Google, 2004.

“Combined Search and Examination Report”, for United Kingdom Patent Application No. GB 0816228.1 dated Jan. 6, 2009.

“Combined Search and Examination Report dated Mar. 7, 2008”, for United Kingdom Patent Application No. GB 0721863.9, Mar. 7, 2008.

“Communication (Combined Search and Examination Report under Sections 17 and 18(3)) dated Jan. 30, 2009 issued from the United Kingdom Patent Office”, in related United Kingdom Application No. GB 0818145.5 (8 pages), Jan. 30, 2009.

“Communication (European Search Report) dated Jun. 26, 2008”, in European Patent Application No. EP 08101394, Jun. 26, 2008.

“Communication (Notification Concerning Transmittal of International Preliminary Report on Patentability, International Preliminary Report on Patentability, and Written Opinion of the International Searching Authority)”, issued in connection with related International Application PCT/EP 2008/051489 and mailed on Sep. 24, 2009 (6 pages), Sep. 24, 2009.

“Communication Pursuant to Article 94(3) EPC (European Examination Report) dated Oct. 23, 2008”, issued in counterpart European Patent Application No. EP 08101394.8-1238, Oct. 23, 2008.

“Examination Report”, for counterpart European Patent Applicaiton No. 08153257.4 issued Jun. 2, 2009.

“Examination Report dated Nov. 9, 2009”, for European Patent Application No. EP 08159355.0, Sep. 11, 2009.

“Examination Report dated Jun. 17, 2009”, issued in counterpart U.K. Application No. GB 0803273.2 by U.K. Intellectual Property Office (4 pages).

“International Search Report”, for International Application No. PCT/FI 2006/050455, dated Jul. 25, 2007.

“International Search Report and Written Opinion mailed on Aug. 26, 2011”, for PCT/US 2011/034927 titled “Content Delivery Based on User Terminal Events,” to Apple Inc., Aug. 26, 2011.

“International Search Report and Written Opinion of the International Search Authority mailed Jun. 19, 2009”, for International Application No. PCT/EP 2008/056069, Jun. 19, 2009.

“International Search Report and Written Opinion of the International Searching Authority mailed Feb. 11, 2009, issued by the International Searching Authority”, in related International Application PCT/EP 2008/063839 (11 pages).

“International Search Report mailed Mar. 24, 2009”, in related PCT International Application No. PCT/EP 2008/063326 (4 pages), Mar. 24, 2009.

“Notice of Allowance dated Apr. 29, 2011”, U.S. Appl. No. 11/888,680, filed Apr. 29, 2011, 13 pages.

“Office Action dated Mar. 31, 2011 issue by the U.S. Patent Office”, in related U.S. Appl. No. 12/080,124 (29 pages), Mar. 31, 2011.

“Office Action issued from the USPTO dated Aug. 20, 2009”, issued in related U.S. Appl. No. 12/075,593 (14 pages), Aug. 20, 2009.

“Office Action issued Mar. 17, 2010”, in related U.S. Appl. No. 12/075,593 (11 pages), Mar. 17, 2010.

“Office Action Issued Oct. 15, 2010 by the U.S. Patent Office”, in related U.S. Appl. No. 12/080,124 (28 pages), Oct. 15, 2010.

“Search Report under Section 17 dated Jul. 7, 2008”, in related U.K. Application GB 0803273.2.

“U.K. Search Report under Section 17 dated Oct. 23, 2007”, in U.K. Application No. 0712280.7, Oct. 23, 2007.

“Written Opinion of the International Searching Authority mailed Mar. 24, 2009 issued from the International Searching Authority”, in related PCT International Application No. PCT/EP 2008/063326 (5 pages), Mar. 24, 2009.

“XP002456252—Statement in Accordance with the Notice from the European Patent Office dated Oct. 1, 2007”, concerning business methods (OJ Nov. 2007; p. 592-593), Nov. 1, 2007, 592-593.

Ghose, Anindya et al., “An Empirical Analysis of Search Engine Advertising: Sponsored Search in Electronic Markets”, Management Science, Informs, 2009.

(56) References Cited

OTHER PUBLICATIONS

Karuga, Gilber G. et al., "AdPalette: An Algorithm for Customizing Online Advertisements on the Fly", Decision Support Systems, vol. 32, 2001.
Mueller, Milton , "Telecommunication Access in Age of Electronic Commerce: Toward a Third-Generation Service Policy", Nov. 1996, HeinOnline, 49. Fed. Comm L.J., Nov. 1, 1996, 655-665.
Perkins, Ed , "When to buy airfare", http://www.smartertrael.com/travel-advice/when-to-buy-airfare.html?id=1628038, Nov. 21, 2006 (4 pages), Nov. 21, 2006.
Science Dictionary, , Definition of "dynamic", 2002.
World English Dictionary, Definition of "relevant", 1998.
"Advertisement System, Method and Computer Program Product", IP.com Prior Art Database Disclosure, Pub No. IPCOM000138557D, dated Jul. 24, 2006, IP.com, Amherst, NY (Available online at http://priorartdatabase.com/IPCOM/000138557, last visited Aug. 30, 2010)., Jul. 24, 2006.
"Combined Search and Examination Report under Sections 17 and 18(3)", U.K. Patent Office in related U.K Application No. GB 0818647.0, Jan. 7, 2009.
"Communication (Communication Pursuant to Article 94(3) EPC)", European Patent Office in connection with related European Patent Application No. 07 822 138.9, Mar. 8, 2010.
"Communication Pursuant to Article 94(3) EPC dated Aug. 13, 2009", issued by the European Patent Office in related European Patent Application No. 07802544.2 (4 pages).
"Communication Pursuant to Article 94(3) EPC dated Nov. 21, 2008", issued in connection with counterpart European Application No. 08802544.2, Nov. 21, 2008.
"Communication Pursuant to Article 94(3) EPC dated Oct. 30, 2009", European Patent Application No. 08 166 443.5 (1 page), Oct. 30, 2009.
"Communication pursuant to Article 94(3) EPC issued Jan. 14, 2011", European Patent Office in related European Application No. 08 761.022.6 (6 pages), Jan. 14, 2011.
"Communication pursuant to Article 94(3) EPC", European Patent Application 07 822 138.9 (4 pages), Mar. 10, 2011.
"Declaration of Non-Establishment of International Search Report", mailed Feb. 27, 2009 issued by the International Searching Authority in related International Application PCT/EP2008/063712 (3 pages), Feb. 27, 2009.
"ETSI TS 100 900 V7.2.0 (Jul. 1999):", Digital Cellular Telecommunication System (Phase 2+); Alphabets and language-specific information (GSM 03.38 Version 7.2.0 Release 1998), European Telecommunications Standards Institute 1999.
"Extended European Search Report dated Mar. 17, 008", EP Application No. 08101544.8, Mar. 17, 2008.
"International Preliminary Report on Patentability and Written Opinion mailed Jan. 7, 2010", International Application PCT/EP2008/057880 (1 page), Jan. 7, 2010.
"International Search Report (Form PCT/ISA/206)", issued in connection with corresponding International Application PCT/EP 2007/058243.
"International Search Report (Form PCT/ISA/210) mailed Feb. 7, 2008", issued in connection with corresponding International Application PCT /EP 2007/058243, Feb. 7, 2008.
"International Search Report and Written Opinion mailed Jan. 14, 2010", International Search Report mailed Jan. 14, 2010 in related International Application PCT/EP2009/062713 (3 pages), Jan. 14, 2010.
"Invitation to Pay Additional Fees and Communication Relating to the Results of the Partial International Search dated Apr. 28, 2008", in corresponding International Application PCT/GB 2007/050723, Apr. 28, 2008.
"Notice of Allowance issued Apr. 2, 2010", USPTO in connection with related U.S. Appl. No. 11/888,850 (11 pages), Apr. 2, 2010.
"Office Action dated Apr. 15, 2010", U.S. Patent Office in connection with related U.S. Appl. No. 12/077,045 (14 pages), Apr. 15, 2010.
"Office Action dated Feb. 2, 2009", issued in related U.S. Appl. No. 12/075,853, Feb. 2, 2009.
"Office Action dated Feb. 5, 2009", U.S. Appl. No. 12/077,089, Feb. 5, 2009.
"Office Action dated Mar. 3, 2009", issued in related U.S. Appl. No. 12/075,862 (24 pages).
"Office Action dated Mar. 31, 2010", U.S. Patent Office in connection with U.S. Appl. No. 12/077,089 (7 pages), Mar. 31, 2010.
"Office Action dated Sep. 3, 2009", issued in related U.S. Appl. No. 12075,862 (19 pages), Sep. 3, 2009.
"Office Action from the USPTO dated Jun. 4, 2009", in related U.S. Appl. No. 11/888,446 (43 pages), Jun. 4, 2009.
"Office Action issued by USPTO dated Dec. 23", issued in related U.S. Appl. No. 12/075,853 (9 pages).
"Office Action issued from the USPTO dated Aug. 18, 2009", U.S. Appl. No. 11/888,850 (9 pages), Aug. 18, 2009.
"Office Action issued from the USPTO dated Aug. 4, 2009", U.S. Appl. No. 12/077,045 (14 pages), Aug. 4, 2009.
"Office Action issued from the USPTO dated Aug. 6, 2009", U.S. Appl. No. 12/077,089, Aug. 6, 2009.
"Office Action issued from the USPTO dated Sep. 29, 2009", issued in related U.S. Appl. No. 12/075,853 (10 pages).
"PCT International Preliminary Report on Patentability", PCT Application No. PCT/EP2007/061792 by the International Bureau of WIPO, May 5, 2009.
"PCT International search report and Written Opinion issued in a related International Application No. PCT/EP2008/057880", Apr. 22, 2009.
"PCT International Search Report and Written Opinion issued in related PCT Application No. PCT/EP2007/061792", International Searching Authority mailed Mar. 7, 2008 (3 pages), Mar. 7, 2008.
"PCT Notification of Transmittal of the International Search Report and the Written Opinion of the International Searching Authority, or the Declaration (3 pgs), PCT International Search Report (2 pgs), and PCT Written Opinion of the International Searching", Authority (8 pgs) mailed Jun. 19, 2009 on a related foreign PCT application PCT/EP2008/056069 issued by PCT International Searching Authority, Jun. 19, 2009.
"U.K Further Search Report under Section 17", U.K. Application No. GB0621874.7, Jul. 25, 2007.
"U.K. Search Report under Section 17 dated Apr. 17, 2007", issued in connection with corresponding U.K. Applicaiton No. GB 0705651.8, Apr. 17, 2007.
"U.K. Search Report under section 17 dated Feb. 23, 2007", U.K Application No. GB0621874.7, Feb. 23, 2007.
"U.K. Search Report under Section 17 dated Jan. 2, 2008", U.K. Application No. GB0716954.3, Jan. 2, 2008.
"U.K. Search Report under Section 17 dated Nov. 20, 2006", issued in connection with corresponding U.K. Application No. GB 0615833.1, Nov. 20, 2006.
"U.K.Search Report under Section 17", U.K. Patent Application No. GB0802986.0, Jun. 26, 2008.
"UKIPO Search Report dated May 30, 2008", UK Application No. GB0802175.0, May 30, 2008.
"WAG UAProf Version Oct. 20, 2001; Wireless Application Protocol WAP-248-UAPROF-20011020-a", Wireless Application Protocol Forum, Ltd. 2001; http://www.wapforum.org/what/copyright.htm, Oct. 20, 2001.
"Written Opinion of the International Searching Authority", International Searching Authority in related International Application PCT/EP2008/063712 (4 pages), Feb. 27, 2009.
Hillard, Dustin et al., "Improving Ad Relevance in Sponsored Search", Proceedings of the third ACM international conference on Web search and data mining, WSDM'10, Feb. 4-6, 2010, Session: Ads, pp. 361-369, ACM, New York, New York, USA, 2010., Feb. 4, 2010, 361-369.
Internet Reference, "Specific Media Behavioral Targeting Index", Specific Media, Inc., Irvine, CA, 2010, Available online at http://www.specificmedia.com/behavioral-targeting.php.
Krallman, Schwiegelshohn Y. , "On the Design and Evaluation of Job Scheduling Algorithms", Lecture Notes in Computer Science, vol. 1659, Jan. 1, 1999, pp. 17-42 (26 pages), Jan. 1, 1999.

(56) References Cited

OTHER PUBLICATIONS

Langheinrich, Marc et al., "Unintrusive Customization Techniques for Web Advertising", Computer Networks: The International Journal of Computer and Telecommunications Networking, vol. 31, No. 11, May 1999, pp. 1259-1272, Elsevier North-Holland, Inc., New York, NY, 1999., May 11, 1999, 1259-1272.
Regelson, Moira et al., "Predicting Click-Through Rate Using Keyword Clusters", Proceedings of the Second Workshop on Sponsored Search Auctions, EC'06, SSA2, Jun. 11, 2006, ACM, 2006., Jun. 11, 2006.
Richardson, Matthew et al., "Predicting Clicks: Estimating the Click-Through Rate for New Ads", Proceedings of the 16th international conference on World Wide Web, Banff, Alberta, Canada, May 8-12, 2007, Session: Advertisements & click estimates, pp. 521-529, ACM, 2007., May 8, 2007, 521-529.
Shaikh, Baber M. et al., "Customized User Segments for AD Targeting", IP.com Prior Art Database Disclosure, Pub No. IPCOM000185640D, dated Jul. 29, 2009 UTC, IP.com, Amherst, NY (Available online at http://priorartdatabase.com/IPCOM/000185640, last visited Aug. 30, 2010)., Jul. 29, 2009.

* cited by examiner

ADVERTISING MANAGEMENT METHOD AND SYSTEM

CROSS-REFERENCE TO RELATED APPLICATION

This application claims the benefit of the filing date of U.S. Provisional Patent Application Ser. No. 60/931,398 filed May 22, 2007, the entire disclosure of which is incorporated by reference herein.

FIELD OF THE INVENTION

The present invention relates to an advertising management method and system for delivering advertisements to mobile multi-media devices of subscribers.

BACKGROUND INFORMATION

The popularity of mobile multi-media devices including telephones has enabled their use, along with related infrastructure, as a media for providing mobile marketing and advertising, i.e., delivering advertisements, to the users of the devices. This is important because such a concept is considered by advertisers as the next new channel to directly reach consumers since it utilizes core assets and characteristics of the mobile media, namely, it is personal in that it is directed solely to individual consumers, it is "always on" and can reach the consumers whenever they access their communications devices, it is mobile and naturally forms groups of people who communicate actively with each other. These characteristics combined with social networks-based approaches of the Internet could form a very powerful base to execute marketing strategies.

In general, mobile marketing and advertising can be divided into the following four categories: mobile marketing, mobile advertising, mobile direct marketing and mobile customer relations management (CRM). The present invention in any of its forms discussed above is applicable to all categories.

Mobile marketing is commonly considered as the systematic planning, implementing and control of a mix of business activities intended to bring together buyers and sellers for the mutually advantageous exchange or transfer of products or services where the primary point of contact with the consumer is via their mobile device.

Mobile advertising is commonly considered as the paid, public, non-personal announcement of a persuasive message by an identified sponsor as well as the non-personal presentation or promotion by a firm of its products to its existing and potential customers where such communication is delivered to a mobile multi-media device, mobile telephone or other mobile device. Examples of mobile advertising include, but are not limited to: Wireless Application Protocol (WAP) Banner ads, mobile search advertising, mobile video bumpers, and interstitial ads in or on device portals.

Mobile direct marketing is commonly considered a sales and promotion technique in which promotional materials are delivered individually to potential customers via the potential customer's mobile multi-media device, mobile telephone or other mobile device. Examples of mobile direct marketing include the sending of Short Message Service (SMS), Multimedia Message Service (MMS) or Wireless Application Protocol (WAP) push messages, Bluetooth messaging and other marketing to mobile telephones or other mobile devices.

Mobile customer relation management is commonly considered as a combination of all the foregoing in a manner that establishes a long-term, engaging relationship between the customer and the marketing or promoting company.

The introduction of mobile telephones with sufficient connectivity enabled by, for example, broadband $3^{rd}$ generation, wireless local area network (WLAN) and/or broadcast connectivity, such as Digital Video Broadcasting for Handheld (DVB-H), and with color screens and processing power has enabled the realization of providing television services to the mobile telephones and other mobile devices, which are now more accurately referred to as mobile multi-media devices. Providing such television services to mobile multi-media devices is generally known as mobile television.

There are basically only a few models of mobile television currently available (which are the same as those for broadcast television). One is free television which is typically paid for by advertisers whose advertisements are interspersed with the programming. Another is a pay television model wherein a subscriber pays for watching a television program or subscribes to a service or channel for a set time period. Combinations of free television and pay television are also available.

Regardless of which model of mobile television is used, the investment for building a mobile television network is relatively high. Therefore, mobile television is currently mostly available by paid subscription, i.e., a user must pay to obtain mobile television service, although there are advertisement and government subsidized channels. Another cost consideration for offering mobile television service is that in some areas, local legislation might require the mobile television operator to offer some or all of the same networks as in normal terrestrial, cable or satellite television.

In a typical broadcast television model in which programming is paid for by advertisers whose advertisements are interspersed with the programming, an advertisement model is generated to determine the cost for the advertisements. The advertisement model relies on predictions on the target audience of the television channel on which the program is being broadcast as well as on the target audience for the specific program that is being broadcast. Several companies, such as Nielsen Research, provide a target audience prediction service and an actual audience computation service to check the accuracy of the prediction in order to improve future predictions.

Advertisers often have concerns with the results of the target audience computations because there is a possibility that viewers might change channels to change the program being viewed and/or might not be watching the television while the advertisements are being broadcast.

These concerns, and others, results in a relatively low "cost per eye ball" or CPM (cost per million) for advertisements delivered via broadcast television. On the other hand, television programs which are statistically popular have large audiences and provide good advertising and marketing opportunities for advertisers.

SUMMARY OF THE INVENTION

The present invention utilizes direct marketing capabilities of a communications network to increase the value ascribed to a mobile television viewer by an advertiser in comparison to the value of a content viewer of traditional broadcasting in which advertisements are sent to all viewers.

In one embodiment of the invention, access to content for viewing and/or listening on multi-media devices is managed by coupling the devices to a broadcast system which processes requests from users for delivery of content to their devices and provides the content to the devices via a broadcast network, and also coupling the devices to a mobile advertisement system which generates revenue from delivery of advertisements to the devices. The broadcast system and the mobile advertisement system are integrated with one another to require exposure to advertisements as a condition for using the content. In this manner, the cost for delivering content to the devices can be offset by revenue generated by the delivery of advertisements to the devices, which is paid by advertisers.

The content may be television programs in which case, the broadcast system is a mobile television system, and the advertisements are of a form which is displayed to the viewers before, during or after watching the television programs.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
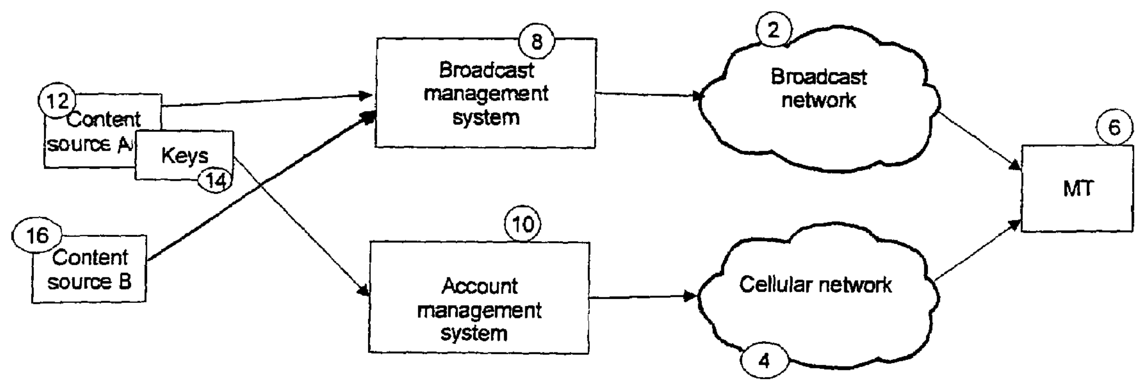
FIG. 1 is a schematic of a mobile television broadcast system in accordance with the invention.

Referring to the accompanying drawings wherein the same reference numerals refer to the same or similar elements, FIG. 1 shows an exemplary arrangement of a mobile broadcast system in accordance with an embodiment of the invention. The mobile broadcast system can have a single content source or multiple, different content sources, of which two different content sources (A & B) 12 and 16 are shown. The content from content source 12 (and any other content sources) may be protected by a set of digital rights management (DRM) keys 14. Thus, the content source 12 is an example of content providing means for providing content and generating a DRM key. From content source 12, the content is fed to a broadcast network 2 via a broadcast management system 8 which typically generates an electronic service guide (ESG) for the services which are broadcast via the system. The broadcast management system 8 may also perform any necessary processing to enable delivery of the content from content source 12 to the desired broadcast destination, for example, transcoding and possibly Internet Protocol addressing needed to forward the content to the desired broadcast destination. Broadcast management system 8 is an example of broadcast managing means for managing delivery of the content from the content providing means to mobile means, e.g., a mobile terminal 6.

The broadcast network 2, when used to broadcast television programs, can be, for example, a DVB-H network. The broadcast network 2 comprises various broadcast components or elements such as Multiprotocol Encapsulations (MPE) and DVB-H transmitters (tx). Typically, there are several (10-50) television programs or streams which can be broadcast at the same time in each frequency allocated for the DVB-H.

The user's mobile multi-media devices, referred to as a mobile terminal 6, comprises a receiver (not shown) for broadcast television, such as a DVB-H receiver, and related software and hardware (not shown) for showing or displaying the received program on a screen (not shown) of the-mobile terminal 6. The mobile terminal 6 can be a monolithic terminal where all components are integrated in a single terminal or the mobile terminal can comprise separate parts which are connected together using wires or wirelessly (such as a separate DVB-H receiver and display screen). Mobile terminal 6 is an example of mobile means capable of presenting content and communicating.

Mobile terminal 6 may also include a cellular connectivity system (not shown) to enable various types of communications via a communications network 4 (for example, a cellular network). The cellular connectivity system may include a Global System for Mobile communications (GSM) transceiver, a 3$^{rd}$ Generation transceiver, a wireless local area network transceiver and related hardware and software, and combinations of these components. The cellular network 4 may be a corresponding GSM network, 3 G network, WLAN, or a combination thereof.

The content from content source 12, designated content A, may be provided free of charge to the mobile terminal 6 or be paid content, i.e., require payment in order to be provided to the mobile terminal 6. When content A is paid content, an account management system 10, which is operatively coupled thereto, is arranged to deliver keys 14 generated by the provider of content A or alternatively, creates associated keys itself. Cellular network & is used to deliver the keys to the mobile terminal 6, which are required in order to use the content A from content source 12. Account management system 10 also manages communications to and from mobile terminal 6 via the cellular network 4. Instead of delivering the DRM keys 14 to the mobile terminal 6 via the cellular network 4, it is possible to deliver the keys 14 using Bluetooth or WLAN or, for example, as a scratch card. The combination of the broadcast management system 8 and account management system 10 is an example of managing means for managing delivery of content to the mobile means, e.g., the mobile terminal 6, and communications to and from the mobile means, e.g., the mobile terminal 6.

In one embodiment, the cellular network 4 is used as a back channel from the mobile terminal 6 to the account management system 10 to pay for the subscription to the broadcast television service. For free content, such as content B from content source 16, there is no need for account management system 10 since no keys 14 need to be delivered to the mobile terminal 6 to enable display (viewing) of the content. Nevertheless, account management system 10 could be needed if the content from content source 16 requires "free" keys, which "free" keys could be provided to the mobile terminal 6 via the cellular network 4.

Figure 2:
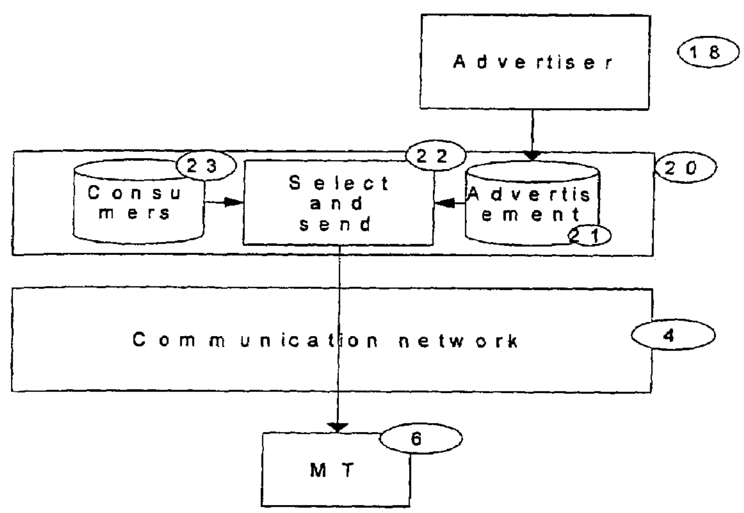
FIG. 2 is a schematic of a mobile advertisement system in accordance with the invention.

Referring now to FIG. 2, an advertisement management technique for mobile multi-media devices or mobile terminals in accordance with the invention allows any number of advertisers 18 to reserve, program and/or book advertising campaigns via a web interface from an advertisement management system 20. In a typical scenario, an advertiser 18 provides advertisement messages to the advertisement management system 20 in the form of data, text, pictures, audio, video, html, xml, xhtml, or any other form capable of being delivered and processed by the mobile terminal 6. Using the interface, each advertiser 18 would also be able to select when to send advertisements, the target group to which the advertisements are to be delivered, the format for delivery of the advertisements, a target price level of the advertisements, a target feedback level of the advertisements, demographics of the target audience, the duration of the advertisement campaign, and any other parameters relating to the advertising campaign.

Advertisers 12 can thus refer to a brand owner, a service provider, an advertisement agent, a merchant or any other party that wants to provide advertisements to consumers. Advertisements can be commercial, such as a product or service promotion, or non-commercial, such as a general information service notification.

Advertisement management system 20 includes a database (advertiser) 21 in which the advertisements provided by the advertisers 18 and related parameters of the advertising campaign selected by the advertisers 18 can be stored.

Advertising management system 20 can thus include a computer program which creates an-interface to enable advertisers 18 to design their advertising campaign, including the advertisements to be used and the delivery parameters thereof. The computer program can manage database 21 and allow the advertisers to update and otherwise manage their campaigns. The advertisement management system 20 thus is an example of advertisement managing means for enabling an advertiser to set rules for delivery of advertisements to each user, and the computer program included therein is an example of interface means for enabling an advertiser to set rules for delivery of advertisements to each user and for presenting advertisers with options for setting rules of an advertising campaign.

Advertisement management system 20 also includes a user (consumer) database 23 which contains profile information of the users having mobile terminals 6 which subscribe to the network. The profile information can be any information about the users including demographics, sex, purchase history, phone number, preferences, likes and dislikes, etc. User database 23 may be integrated with advertiser database 21 and they are not required to be separate elements as depicted in FIG. 2.

A processing element or software block (select and send) 22 is coupled to the user database 23 and to the advertiser database 21 and combines advertisers' preferences and the rules of the advertisers' advertising campaigns as stored in the advertiser database 21, and the data in the user database 23 to deliver advertisements to mobile terminals 6 via the communications network 4.

For example, an advertiser might want to send to all female users a message "Product A is good" on a Monday afternoon. In this process, the advertisement, i.e., the text "Product A is good", delivery time and preferred target are programmed via a web interface by the advertiser or its representative into the advertising management system 20. The processing element 22 thus receives these parameters and the advertisement from the advertiser database 21 and identifies female users from the data in user database 23 and delivers the advertisements to them accordingly.

Figure 3:
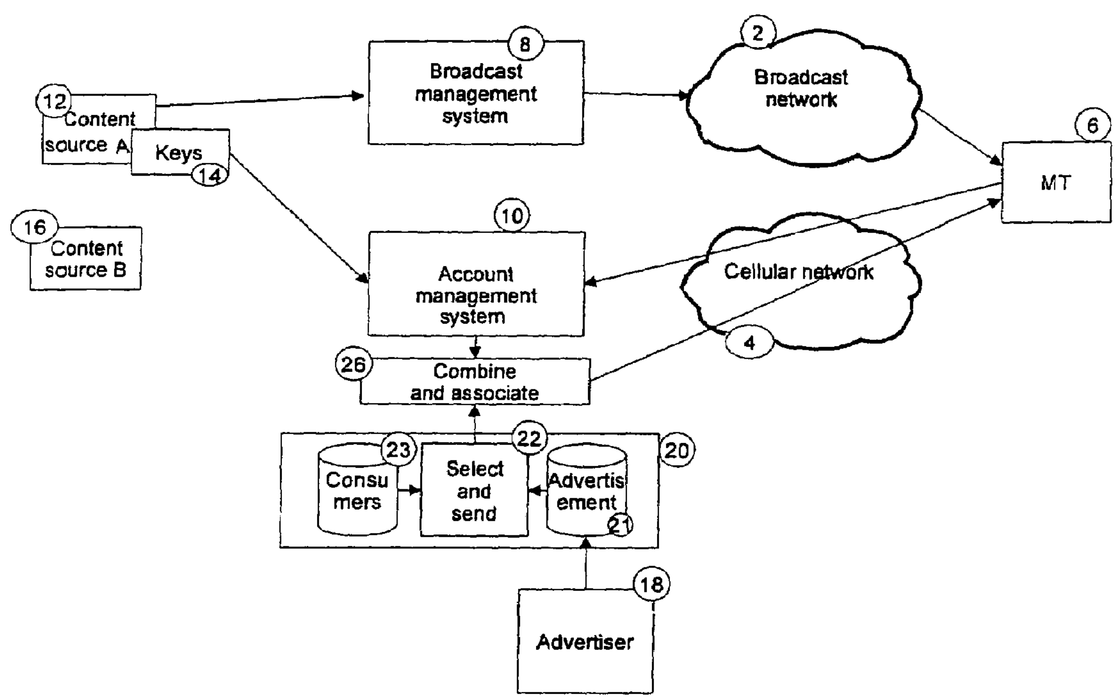
FIG. 3 is a schematic of a combined mobile television broadcast and advertisement system in accordance with the invention.

Referring now to FIG. 3, in one embodiment of the invention, the mobile television broadcast system shown in FIG. 1 is combined with the advertising management technique shown in FIG. 2 to provide a mobile television service network which can offer subsidized or free mobile television service as a result of receiving payment from advertisers to intersperse advertisements with the programs being delivered to users' mobile terminals. In this manner, the invention provides advertisement driven mobile television.

As shown in FIG. 3, this is implemented by a processor, processing unit or server, or software block "Combine and associate" 26 which operatively couples the advertisement management system 20 (described above with reference to FIG. 2) to the account management system 10 (described above with reference to FIG. 1). The processing unit 26 is also operatively coupled to the cellular network 10 and receives requests for viewing, and also possibly delivery, of television programs from the mobile terminal 6. The user of mobile terminal 6 may only need to request viewing of a television program if they have already received it, either via broadcast network 2 or other means.

The mobile television service in accordance with the invention can be implemented in several ways, some of which are described below. For paid content A to be delivered from content source 12 to the user's mobile terminal 6, or for previously obtained paid content A to be viewed on the user's mobile terminal 6, the user's mobile terminal 6 may be programmed to recognize that a key 14 is needed to access content A and then request a key 14 from the account management system 10. A request for a key 14 would be considered by account management system 10 to be a request to view a television program. The account management system 10 communicates with the processing unit 26, or possibly even directly with the advertising management system 20, to find out if the user and the content A could be sponsored by one or more advertisers 18. The advertiser or advertisers would sponsor delivery and viewing (display) of content A if it has not already been provided to the user's mobile terminal 6, or only viewing (display) of content A if it has already been delivered or provided to the user's mobile terminal 6. Sponsorship of content A is thus either sponsorship for delivery and viewing (display) of content A or sponsorship for only viewing (display) of content A.

A computer program in the account management system 10 and/or advertisement management system 20 could perform this analysis in order to determine whether content A is available for sponsorship and whether sponsorship of content A satisfies the parameters or rules provided by any of the advertisers 18. In the latter case, this may entail analyzing the data about the user of mobile terminal 6 and comparing the user's profile data to data provided by advertisers 18 for a target audience of an advertising campaign. Thus, the computer program in the account management system 10 and/or advertisement management system 20 is an example of analyzing means coupled to the managing means for analyzing requests for content relative to information about users of the mobile means in order to determine whether use of content by the users can be sponsored.

If the computer program determines that content can be sponsored for the user, the processing unit 26 forms an advertisement packet with embedded DRM keys in the advertisement, or otherwise associates the DRM key or keys with the advertisement. One possible embodiment is to send an advertisement with an interactive link. As the user clicks or selects the link, the DRM key is delivered to the user. Alternatively, there can be advertisements which are sent as a flash Short Message Service (SMS) at the same time (or before or after) the DRM keys are delivered.

The advertisement packet is delivered from the processing unit 26 to the user's mobile terminal 6 via the cellular network 4, or may also possibly be delivered via the broadcast network 2. The user's mobile terminal 6 receives the advertisement packaged with the DRM keys and is able to then open the content stream received from content source 12 via the broadcast network 2, i.e., a television program, after being exposed to the advertisement or in consideration for being subsequently exposed to the advertisement during or after viewing of a television program.

With this arrangement, the owner of content A agrees to its viewing (display) by the user of mobile terminal 6 and possibly also its delivery to the user's mobile terminal 6 in exchange for allowing one or more advertisements to be delivered to the user to enable use of the content A. Content A has thus become advertisement-paid content. Alternatively, the owner of content A may receive payment from advertisers who associate their advertisements with the DRM keys 14, these payments essentially being made on behalf of the user of the mobile terminal 6 receiving content A. This may be a direct or indirect payment from advertisers 18.

In one embodiment, advertisements are not required to be associated with DRM keys 14, but rather, a sponsorship message is delivered to the user's mobile terminal 6 with the content A. For example, when a user is determined to satisfy the criteria for an advertiser's campaign, content A is delivered to the user's mobile terminal with a direct marketing message such as "Content A is sponsored by Product X". The processing unit 26 would thus deliver DRM keys 14 without packaging them with one or more advertisements.

In another embodiment, the users' feedback or response to advertisements sent before, during and/or after the mobile television broadcast is analyzed and that information is used to determine if the consumer will subsequently be provided with free or subsidized television programs. In this case, a user who provides certain responses could be rewarded with free or subsidized television service and would not necessarily be required to receive advertisements in order to enable access to the television programs.

In the context of this document, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

Several computer programs resident on computer-readable media may be used in the invention. One computer program manages access to television programs for viewing on multimedia devices capable of viewing television programs obtained, for example, via a broadcast network and communicating, for example, via a cellular network. This computer program may be resident on a server which integrates a mobile television system such as shown in FIG. 1 and a mobile advertisement system such as shown in FIG. 2. The computer program may thus obtain data about the users of the devices (usually performed by the mobile advertisement system), receive requests from users for delivery of television programs to their devices (usually performed by the mobile television system), and analyze the data about the users and the requested television programs to determine whether delivery of the television program to each user can be sponsored. This latter step may be performed by a processor or an integration unit (e.g., the processing unit 26 as shown in FIG. 3) which interacts with the mobile television system and the mobile advertisement system. The processing unit 26 effects delivery of at least one advertisement (from the mobile advertisement system) to that user's device if the delivery of the television program to a user can be sponsored.

The devices should be programmed or otherwise arranged to present the advertisement to the user in conjunction with viewing of the program. For example, when a DRM key is required to view the program, the computer program processes requests from users for delivery of DRM keys and arranges for delivery of DRM keys upon request. In one embodiment, the computer program packages advertisements and DRM keys in a packet and delivers the packet to the devices.

The computer program may be the same as or different than the computer program which manages communications to and from the devices, e.g., via a cellular network.

As part of the integration with the mobile advertisement system, the computer program may be arranged to generate an interface which enables advertisers to set rules for delivery of advertisements to the users. The computer program would then analyze the data about the users and the requested television programs to determine whether delivery of the television program to each user can be sponsored, i.e., determine if each user satisfies rules set by any of the advertisers. If not, the computer program could be designed not to provide any advertisements to the users devices with the television programs. On the other hand, the computer program would cause one or more advertisements to be delivered to the users' devices to be viewed when viewing the television program.

The computer program may also be arranged to monitor each advertiser's sponsorship of delivery of television programs to users and bill the advertisers for their sponsorship of delivery of television programs to users. It could store advertisements and set rules provided by advertisers in a database and data about the users in the same or another database, and determine if each user satisfies rules set by any of the advertisers by accessing the first and second databases.

Figure 4:
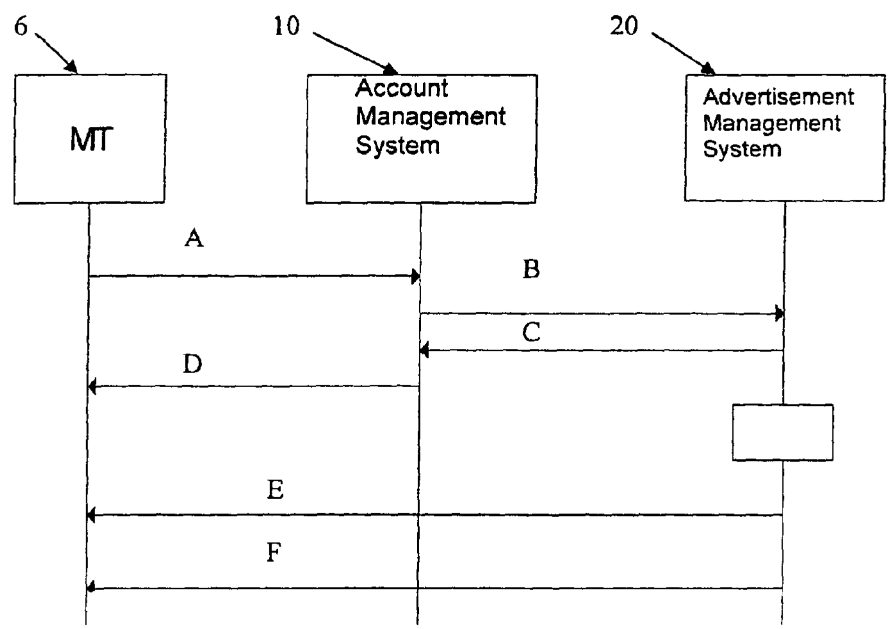
FIG. 4 shows one possible flow of messages in the combined mobile television broadcast and advertisement system in accordance with the invention.

Referring now to FIG. 4, an exemplary message flow in the system shown in FIG. 3 is illustrated. Initially, there is a message A from the user's mobile terminal (MT 6) to the account management system 10 indicating that the user will start, is about to start or has started to watch a specific, potentially sponsored television channel. The message can refer to a specific message originating from the mobile terminal 6 containing information about which channel is being watched (i.e., which message generation can be performed by an application or computer program in the mobile terminal 6) or the message can refer to a request to download DRM keys associated with the particular television channel or possibly a particular television program on a specific channel.

This initial message from the mobile terminal 6 will trigger a further message B from the account management system 10 to the advertisement management system 20, if the initial message was sent to the account management system 10. As an alternative, the initial message may be directed from the mobile terminal 6 directly to the advertising management system 20, thereby consolidating messages A and B.

In one embodiment, there is an answer to message B from the advertisement management system 20, namely message C, indicating that it is appropriate to deliver DRM keys and/or indicating the parameters of the DRM key. These parameters might include one or more permitted watching times, an expiration time of the delivered, sponsored DRM keys and date of the delivered sponsored DRM keys, and possibly other parameters relating to use of the television program.

Upon receipt of message C, account management system 10 will deliver keys to the mobile terminal 6, for DRM related content, this being message D. For free content and a mobile terminal 6 having an application or computer program which sends information to account management system 10, there is not necessarily any communication from account management system 10 to the mobile terminal 6, since DRM keys are not needed to watch the television program. The message D from account management system 10 to the mobile terminal 6 might initiate, or be the result of, a scheduling process in the advertisement management system 20. This scheduling process could state parameters and timing of the advertisement (s) to be sent to mobile terminal 6, i.e., messages E and F, and/or parameters and timing of advertisements to be presented to the user at their mobile terminal 6, independent of and following the delivery thereof. The parameters and timing of the delivery of the advertisements may be relative to delivery of the DRM keys to the user's device, relative to the start of use of the television program by the user's device, relative to use of the television program, and/or relative to a duration of validity of the DRM keys.

Thus, one example of the scheduling of advertisements could be the sending of a flash SMS-based advertisement from advertisement management system 20 every fifteen minutes after the delivery of the DRM keys to the user's mobile terminal 6 or sending an advertisement every fifteen minutes after the user's mobile terminal 6 indicates that the user is watching the television program for which the DRM keys have been provided.

Another example of the scheduling of advertisements could be to always send one advertisement immediately after delivery of the DRM keys in order to ensure that the user is really watching the display of the mobile terminal 6.

Yet another example of the scheduling of advertisements could be to initiate the scheduling process to send a MMS message to the users every thirty minutes after receiving an indication that a specific television channel is being watched.

Another example of the scheduling of advertisements could be to send a logo to be embedded-into the television channel to be used after receiving a message that that television channel is being watched. The advertisement in this case is the display of the logo on the television program being watched on that channel.

Still another example of the scheduling of advertisements could be the sending of an advertisement in a periodic manner, a predetermined or random period, for the duration of the validity of the DRM keys. This embodiment enables an advertisement or promotional campaign including for example, delivery of a monthly subscription to users for free, and then sending a daily message to each user of the type "Remember to watch channel xx it is sponsored to you by product yy" or "You still can watch channel xx for 25 days, thanks to product yy".

The term "DRM keys" as used herein can refer to content protection in which the actual content viewing and/or rendering and/or storing to a mobile terminal is restricted and/or controlled by DRM keys. The term "DRM keys" can also refer to transport protection in which the keys enable reception of Internet Protocol packets, for IP traffic being arranged to be secured by means such as IP security. Alternatively, the term "DRM keys" can refer to conditional access keys used to decrypt transport stream packet and related data of the DVB transmission.

The term "broadcast" can also include cellular broadcast using for example Multimedia Broadcast Multicast Service (MBMS) over Wideband Code Division Multiplex Access (WCDMA) or using technologies such as Digital Audio Broadcast (DAB), ISDB-T (Integrated Services Digital Broadcast Terrestrial), MediaFlo of Qualcomm, FM radio, RDS functionality of FM radio, satellite broadcast, Wireless local area networks, etc, and other networks capable of delivering television, video, audio, and/or other digital data (like files, applications, software, pictures, maps, location information, tags about the locations) to mobile terminals.

The term "television program" is generally used above. However, the scope of the invention is not limited to television programs. The invention can be used also in a similar manner as described above to allow access to, for example, television channels, movies if considered distinct from television programs, a set of television channels, a bundle of television channels, a bundle of television programs such as episodes of a common program, satellite radio systems, DAB radio, FM radio, systems delivering data, systems delivering applications, systems delivering data for applications such as browsers, system delivering map data for map applications, systems delivering video, systems delivering audio and combinations thereof. This listing is not meant to be exhaustive but only illustrative, and the scope of the invention is meant to include any content which is deliverable to a multimedia device. All of the foregoing will be considered and encompassed by the term "content" as used herein.

From the business model point of view content provider, broadcast network operator, access network operator, advertisement system operator, DRM keys provider, the advertiser may or may not be a single party having a business interest, ownership, control of one or more of the blocks of the system. One example of such could be that the DRM keys are provided to consumers by an advertiser which has purchased those first from content owner(s).

Having described exemplary embodiments of the invention with reference to the accompanying drawings, it will be appreciated that the present invention is not limited to those embodiments, and that various changes and modifications can be effected therein by one of ordinary skill in the art without departing from the scope or spirit of the invention as defined by the appended claims.

The invention claimed is:

1. A method, comprising:

providing, by a computer processor, access to a first content to a user's device;

receiving, by the computer processor, a request from the user to use the first content on the user's device;

analyzing, by the computer processor, profile information about the user and the first content to determine whether use of the first content by the user can be sponsored based on the profile information and the first content;

upon a determination that use of the first content by the user can be sponsored, selecting, by the computer processor, a first advertisements from a plurality of different advertisements to deliver to the user based on the profile information, wherein the first advertisement includes an interactive link;

delivering, by the computer processor, the first advertisement and the first content to the user's device, wherein the first content requires a digital rights management (DRM) key to enable use of the first content;

determining, by the computer processor, that the user selected the interactive link included in the first advertisement; and in response to the user selecting the interactive link, transmitting, by the computer processor, the DRM key to the user's device, wherein the DRM key enables the user's device to use the first content.

2. The method of claim 1, wherein the step of analyzing is performed only after receiving the request from the user.

3. The method of claim 1, further comprising:

generating the DRM key at a content source.

4. The method of claim 1, wherein the DRM key is delivered via a cellular network.

5. The method of claim 1, further comprising:

packaging the first advertisement and the DRM key in a packet, wherein the packet is delivered to the user's device.

6. The method of claim 1, further comprising:

determining a time for delivery of the first advertisement and DRM key to the user's device.

7. The method of claim 1, further comprising:

receiving, from an advertiser, rules for delivery of the first advertisement to the user, wherein the step of analyzing comprises determining if the user satisfies the rules.

8. The method of claim 1, further comprising:

delivering the first advertisement to the user's device via the cellular network.

9. The method of claim 1, further comprising:

obtaining the first content from a content source, wherein the DRM key is delivered to the user's device via a cellular network independent of delivery of the first advertisement.

10. The method of claim 1, further comprising:

receiving, from the user, feedback in response to the first advertisement;

receiving a subsequent request from the user for use of a second content; and determining whether user of the second content by the user can be sponsored based on any feedback provided by the user in response to the first advertisement, whereby the second content can be used by the user without an advertisement based on the feedback to the first advertisement.

11. The method of claim 1, wherein the step of providing comprises delivering television programs to the user's device via a broadcast network.

12. The method of claim 7, further comprising:

billing the advertiser for sponsorship of the first content.

13. The method of claim 7, further comprising:

directing the advertiser to pay an of the first content for sponsorship of the first content.

14. The method of claim 7, wherein the rules for delivery are received via an interface which presents advertisers with options for setting rules of an advertising campaign.

15. The method of claim 7, further comprising:

storing the rules in a first database; and obtaining and storing profile information about the user in a second database, wherein the step of analyzing comprises accessing the first and second databases to determine whether the use of the first content can be sponsored.

16. A system, comprising:

a computer processor; and a memory containing instructions that, when executed, cause the processor to:

provide access to a first content to a user's device;

receive a request from the user to use the first content on the user's device;

analyze profile information about the user and the first content to determine whether use of the first content by the user can be sponsored based on the profile information and the first content;

upon a determination that use of the first content by the user can be sponsored, select a first advertisements from a plurality of different advertisements to deliver to the user based on the profile information, wherein the first advertisement includes an interactive link;

deliver the first advertisement and the first content to the user's device, wherein the first content requires a digital rights management (DRM) key to enable use of the first content;

determine that the user selected the interactive link included in the first advertisement; and in response to the user selecting the interactive link, transmit the DRM key to the user's device, wherein the DRM key enables the user's device to use the first content.

17. The system of claim 16, wherein the step of analyzing is performed only after the request from the user is received.

18. The system of claim 16, wherein the instructions further cause the computer processor to:

generate the DRM key at a content source.

19. The system of claim 16, wherein the DRM key is delivered via a cellular network.

20. The system of claim 16, wherein the instructions further cause the computer processor to:

package the first advertisement and the DRM key in a packet, wherein the packet is delivered to the user's device.

21. The system of claim 16, wherein the instructions further cause the computer processor to:

determine a time for delivery of the first advertisement and DRM key to the user's device.

22. The system of claim 16, wherein the instructions further cause the computer processor to:

receive, from an advertiser, rules for delivery of the first advertisement to the user, wherein the step of analyzing comprises determining if the user satisfies the rules.

23. The system of claim 16, wherein the instructions further cause the computer processor to:

deliver the first advertisement to the user's device via the cellular network.

24. The system of claim 16, wherein the instructions further cause the computer processor to:

obtain the first content from a content source, wherein the DRM key is delivered to the user's device via a cellular network independent of delivery of the first advertisement.

25. The system of claim 16, wherein the instructions further cause the computer processor to:

receive, from the user, feedback in response to the first advertisement;

receive a subsequent request from the user for use of a second content; and determine whether user of the second content by the user can be sponsored based on any feedback provided by the user in response to the first advertisement, whereby the second content can be used by the user without an advertisement based on the feedback to the first advertisement.

26. The system of claim 16, wherein the step of providing comprises delivering television programs to the user's device via a broadcast network.

27. The system of claim 22, wherein the instructions further cause the computer processor to:

bill the advertiser for sponsorship of the first content.

28. The system of claim 22, wherein the instructions further cause the computer processor to:

direct the advertiser to pay an owner of the first content for sponsorship of the first content.

29. The system of claim 22, wherein the rules for delivery are received via an interface which presents advertisers with options for setting rules of an advertising campaign.

30. The system of claim 22, wherein the instructions further cause the computer processor to:

store the rules in a first database; and obtain and store profile information about the user in a second database, wherein the step of analyzing comprises accessing the first and second databases to determine whether the use of the first content can be sponsored.

31. A non-transitory computer-readable medium containing instructions that, when executed by a computing device, cause the computing device to:

provide access to a first content to a user's device;

receive a request from the user to use the first content on the user's device;

analyze profile information about the user and the first content to determine whether use of the first content by the user can be sponsored based on the profile information and the first content;

upon a determination that use of the first content by the user can be sponsored, select a first advertisements from a plurality of different advertisements to deliver to the user based on the profile information, wherein the first advertisement includes an interactive link;

deliver the first advertisement and the first content to the user's device, wherein the first content requires a digital rights management (DRM) key to enable use of the first content;

determine that the user selected the interactive link included in the first advertisement; and in response to the user selecting the interactive link, transmit the DRM key to the user's device, wherein the DRM key enables the user's device to use the first content.

32. The non-transitory computer-readable medium of claim 31, wherein the step of analyzing is performed only after the request from the user is received.

33. The non-transitory computer-readable medium of claim 31, wherein the instructions further cause the computing device to:

generate the DRM key at a content source.

34. The non-transitory computer-readable medium of claim 31, wherein the DRM key is delivered via a cellular network.

35. The non-transitory computer-readable medium of claim 31, wherein the instructions further cause the computing device to:

package the first advertisement and the DRM key in a packet, wherein the packet is delivered to the user's device.

36. The non-transitory computer-readable medium of claim 31, wherein the instructions further cause the computing device to:

determine a time for delivery of the first advertisement and DRM key to the user's device.

37. The non-transitory computer-readable medium of claim 31, wherein the instructions further cause the computing device to:

receive, from an advertiser, rules for delivery of the first advertisement to the user, wherein the step of analyzing comprises determining if the user satisfies the rules.

38. The non-transitory computer-readable medium of claim 31, wherein the instructions further cause the computing device to:

deliver the first advertisement to the user's device via the cellular network.

39. The non-transitory computer-readable medium of claim 31, wherein the instructions further cause the computing device to:

obtain the first content from a content source, wherein the DRM key is delivered to the user's device via a cellular network independent of delivery of the first advertisement.

40. The non-transitory computer-readable medium of claim 31, wherein the instructions further cause the computing device to:

receive, from the user, feedback in response to the first advertisement;

receive a subsequent request from the user for use of a second content; and determine whether user of the second content by the user can be sponsored based on any feedback provided by the user in response to the first advertisement, whereby the second content can be used by the user without an advertisement based on the feedback to the first advertisement.

41. The non-transitory computer-readable medium of claim 31, wherein the step of providing comprises delivering television programs to the user's device via a broadcast network.

42. The non-transitory computer-readable medium of claim 37, wherein the instructions further cause the computing device to:

bill the advertiser for sponsorship of the first content.

43. The non-transitory computer-readable medium of claim 37, wherein the instructions further cause the computing device to:

direct the advertiser to pay an owner of the first content for sponsorship of the first content.

44. The non-transitory computer-readable medium of claim 37, wherein the rules for delivery are received via an interface which presents advertisers with options for setting rules of an advertising campaign.

45. The non-transitory computer-readable medium of claim 37, wherein the instructions further cause the computing device to:

store the rules in a first database; and obtain and store profile information about the user in a second database, wherein the step of analyzing comprises accessing the first and second databases to determine whether the use of the first content can be sponsored.

* * * * *

UNITED STATES PATENT AND TRADEMARK OFFICE

CERTIFICATE OF CORRECTION

PATENT NO. : 8,935,718 B2
APPLICATION NO. : 12/080124
DATED : January 13, 2015
INVENTOR(S) : Janne Aaltonen It is certified that error appears in the above-identified patent and that said Letters Patent is hereby corrected as shown below:

In the claims:

On Column 11, line 31 – Please change "whether user" to "whether use"

On Column 11, line 43 – Please change "to pay an of" to "to pay an owner of"

On Column 12, line 52 – Please change "whether user" to "whether use"

On Column 14, line 26 – Please change "whether user" to "whether use"

Signed and Sealed this
Nineteenth Day of January, 2016

Michelle K. Lee
*Director of the United States Patent and Trademark Office*

UNITED STATES PATENT AND TRADEMARK OFFICE

CERTIFICATE OF CORRECTION

PATENT NO. : 8,935,718 B2
APPLICATION NO. : 12/080124
DATED : January 13, 2015
INVENTOR(S) : Janne Aaltonen It is certified that error appears in the above-identified patent and that said Letters Patent is hereby corrected as shown below:

On title page 1, column 1, under item (22) Filed, the filing date "Apr. 4, 2008" should read --Apr. 1, 2008--.

Signed and Sealed this
Seventh Day of June, 2016

Michelle K. Lee

Michelle K. Lee
*Director of the United States Patent and Trademark Office*